Dec. 8, 1936. W. C. JOHNSON 2,063,101
SETTING OUT MACHINE
Filed June 27, 1936
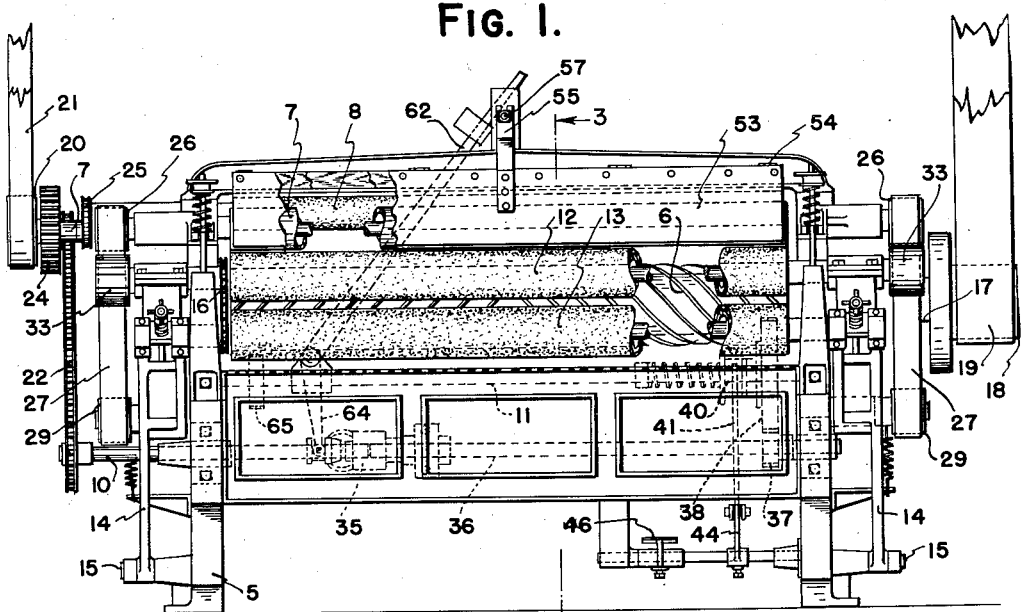
FIG. 1.
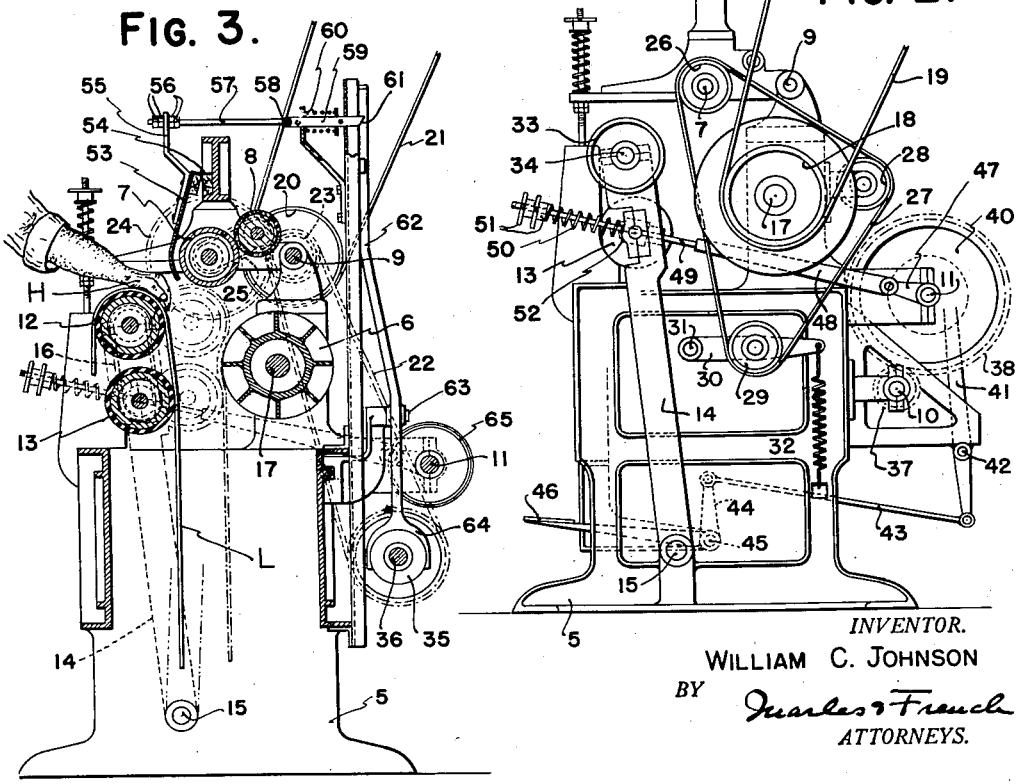
FIG. 2.
FIG. 3.
INVENTOR.
WILLIAM C. JOHNSON
BY Quarles & French
ATTORNEYS.

Patented Dec. 8, 1936

2,063,101

UNITED STATES PATENT OFFICE 2,063,101

SETTING OUT MACHINE

William C. Johnson, Milwaukee, Wis., assignor to Machinery Development Company, Milwaukee, Wis., a corporation of Wisconsin Application June 27, 1936, Serial No. 87,724

4 Claims. (Cl. 149—8)

The invention relates to setting out or putting out machines and more particularly to a safety attachment for such machines to stop the machine in case the operator should accidentally or carelessly get his hand or hands between parts of the mechanism while feeding the leather thereto and thus prevent serious injury. More particularly according to the present invention a clutch for stopping the drive to the feed rolls is under the control of the operator through a guard rendered operative by the operator in case he gets his hand in between certain of the rolls.

The invention further consists in the several features hereinafter described and more particularly defined by claims at the conclusion hereof.

In the drawing:

Fig. 1 is a front elevational view of a setting out machine equipped with a safety device embodying the invention;

Fig. 2 is an end elevational view of the machine;

Fig. 3 is a vertical sectional view taken on the line 3—3 of Fig. 1.

In the drawing, the numeral 5 designates the main frame of the machine in which a helically grooved setting out or putting out roll 6, pull out feed roll 7 with its cleaner roll 8, and shafts 9, 10, and 11 are journalled. A pair of feed rolls 12 and 13 are carried by arms 14 mounted to swing about spaced pivots 15 and connected together by a chain 16 running over sprockets on the shafts of said rolls 12 and 13.

The shaft 17 for the roll 6 carries a drive pulley 18 driven from any suitable source of power by a belt 19. The shaft 9 carries a pulley 20 connected by a belt 21 with any suitable source of power and in turn is connected by a chain and sprocket drive 22 to the shaft 10 and by gears 23 and 24 to the shaft for the roll 7. The shaft for the roll 7 is connected by a chain and sprocket drive 25 to the shaft for the cleaner roll 8. The shaft for the roll 7 also has pulleys 26 mounted thereon on opposite sides of the frame of the machine, each pulley being connected by a belt 27 with idler pulleys 28 and 29, each pulley 29 being mounted as a tensioning pulley on a swinging member 30 pivoted at 31 and pulled downwardly by a spring 32.

The belts 27 are adapted to be engaged by pulleys 33 at the ends of the shaft 34 for the feed roll 12. When said roll and its companion roll 13 are moved inwardly to bring the roll 12 into cooperative feeding relationship with the roll 7, the rolls 12 and 13 are moved into and out of feeding relation relative to the roll 7 and the roll 6 by means for intermittently reciprocating the supports 14. For this purpose the shaft 10 is connected by any suitable friction clutch 35 with an alined shaft 36 carrying a gear 37 meshing with a gear 38 loose on a shaft 11 but adapted to be connected thereto by any suitable automatic throw out clutch 40, such as is commonly employed on punch presses and other similar forms of apparatus, to stop the drive after one-half a revolution of the shaft and which is controlled by the operator through a lever 41 pivoted on the frame of the machine at 42 and operatively connected by a link 43 with a bell crank lever 44 pivoted at 45 and having a treadle portion 46.

The shaft 11 at its ends is provided with cranks 47 connected by links 48 with the levers 14. Each of the links includes a rod 49 mounted for pivotal movement relative to its associated lever 14 and also for sliding movement relative thereto and having a spring 50 interposed between adjustable nuts 51 on its outer end and a boss 52 on the lever and through which said rod works.

With this construction it will be noted that the setting out roll 6 and the rolls 7 are rotating all the time and that when the operator presses down on the pedal 46, the clutch 40 will be engaged and thereby establish the drive through the shafts 10 and 36 which are usually in one piece and which operate to turn the shaft 11 and consequently swing the cranks 47 and the links 48 so as to swing the levers 14 toward the right and at the same time rotate the rolls 12 and 13 by the drive of the shaft 34 from the belts 27 associated with the shaft 7. After the shaft 11 has made a half revolution, the clutch 40 disengages the gear 38 from the shaft 11. Before the rolls 12 and 13 are moved to their innermost feeding position the operator inserts the side of the leather L into the machine over the top roll 12 and allows it to hang down across the roll 13, and this leather is worked in the usual manner by the operation of the roll 6 when the rolls 12, 13, 7, and 6 are in cooperative relation. When the roll 12 is in feeding relation with the roll 7, the operator again depresses the pedal 46 to engage the clutch 40, and during the next one-half revolution of the shaft 11 the rolls 7 and 12 move out of operative relationship.

In the feeding in of the leather L into the machine it sometimes happens that the operator gets his hands H severely pinched between the roll 12 and the roll 7 because of his failure to withdraw his hand from between these rolls at the proper time, and in order to prevent serious injury to the hand or hands of the operator during the working of the machine means are provided for automatically stopping the drive of the shaft 36 to the shaft 11 if the operator's hand gets into a dangerous position between the rolls 12 and 7.

For this purpose a guard plate 53 is pivoted at 54 on the frame of the machine and extends down adjacent the front face of the roll 7 to a position where its lower edge portion will be struck by the hand of the operator before his hand could strike the roll 7. The upper end of the plate has an arm 55 secured thereto which is operatively connected by nuts 56 to a rod 57 passing through the upper end of the arm 55 and pivotally connected at 58 to a latch 59 normally urged toward the right by a spring 60. The bevelled outer edge 61 of this latch normally projects in front of a clutch lever 62 which is pivoted intermediate its ends at 63 on the frame of the machine and has a shifter fork portion 64 associated with the shiftable part of the clutch 35. A brake 65 is also associated with the shaft 11 and is tensioned to exert a braking force on said shaft at all times. With this construction when the lever 62 is engaged by the latch 59 and held in an elevated position, the clutch 35 will be engaged so that the shafts 10 and 36 turn as a unit.

If, however, the operator gets his hand into a dangerous position between the rolls 12 and 7, he will strike the lower end portion of the guard plate 53 before his hand is pinched between the rolls 12 and 7 and will thus swing the lower end of the guard plate 53 toward the roll 7 and in so doing move the rod 57 and the latch 59 toward the left against the action of the spring 60, thereby releasing the clutch lever 62 which due to its weight swings downwardly and thus disengages the clutch 35 which thereby disconnects the shafts 10 and 36 and consequently stops the drive of the shaft 11 and consequently the inward movement of the levers 14 and the rolls 12 and 13 associated therewith which, as has previously been noted, are operatively connected to the shaft 11 through the crank members 47 and the links 48. The stopping of the shaft 11 through the disengagement of the clutch 35 is further assisted by the action of the brake 65 on said shaft which exerts its braking force thereon to quickly stop said shaft. Thus the feeding operation of the machine is stopped before serious injury can result to the hand or hands of the operator.

I desire it to be understood that this invention is not to be limited to any particular form or arrangement of parts except in so far as such limitations are included in the claims.

What I claim as my invention is:

1. In a machine of the character described, the combination with the setting out roll and the pull out feed roll, of an intermittently rotatable feed roll movable into feeding relation with said pull out roll, means for moving said last named feed roll into such feeding relation including a drive clutch and means for stopping the operation of said last named means in case the operator gets his hand between said pull out roll and said movable feed roll, comprising a movable guard plate projecting in front of said pull out roll and in the path of the hand of the operator, clutch shifting mechanism for said clutch controlled by said guard plate, and a brake acting on said moving means.

2. In a machine of the character described, the combination with the setting out roll and the pull out feed roll, of an intermittently rotatable feed roll movable into feeding relation with said pull out roll, means for moving said last named feed roll into such feeding relation including a drive clutch, and means for stopping the operation of said last named means in case the operator gets his hand between said pull out roll and said movable feed roll comprising a pivoted guard plate projecting in front of said pull out roll and in the path of the hand of the operator and clutch shifting mechanism for said drive clutch controlled by said guard plate.

3. In a machine of the character described, the combination with the setting out roll and the pull out feed roll, of an intermittently rotatable feed roll movable into feeding relation with said pull out roll, means for moving said last named feed roll into such feeding relation including a drive clutch, and means for stopping the operation of said last named means in case the operator gets his hand between said pull out roll and said movable feed roll comprising a pivoted guard plate projecting in front of said pull out roll and in the path of the hand of the operator and a lever for the release of said drive clutch controlled by said guard plate.

4. In a machine of the character described, the combination with the setting out roll and the pull out feed roll, of an intermittently rotatable feed roll movable into feeding relation with said pull out roll, means for moving said last named feed roll into such feeding relation including a drive clutch, and means for stopping the operation of said last named means in case the operator gets his hand between said pull out roll and said movable feed roll comprising a pivoted guard plate projecting in front of said pull out roll and in the path of the hand of the operator, a reciprocatory latch operatively connected to said guard plate, and a gravity actuated lever for the release of said drive clutch controlled by said guard plate.

WILLIAM C. JOHNSON.